March 30, 1926.  
F. L. HOAGLIN  
INTERNAL COMBUSTION ENGINE  
Filed March 8, 1920  
1,578,825  
2 Sheets-Sheet 1

Inventor  
Frank L. Hoaglin  
By Erwin Wheeler & Woolard  
Attorneys.

March 30, 1926.

F. L. HOAGLIN 1,578,825

INTERNAL COMBUSTION ENGINE

Filed March 8, 1920  2 Sheets-Sheet 2

Inventor
Frank L. Hoaglin
By Erwin Wheeler & Woolard
Attorneys.

Patented Mar. 30, 1926.

1,578,825

UNITED STATES PATENT OFFICE.

FRANK L. HOAGLIN, OF WAUPACA, WISCONSIN.

INTERNAL-COMBUSTION ENGINE.

Application filed March 8, 1920. Serial No. 364,096.

*To all whom it may concern:*

Be it known that I, FRANK L. HOAGLIN, a citizen of the United States, residing at Waupaca, county of Waupaca, and State of Wisconsin, have invented new and useful Improvements in Internal-Combustion Engines, of which the following is a specification.

This invention relates to internal combustion engines and to a method of transforming the chemical energy of a liquid fuel into mechanical energy with increased efficiency and economy.

One of the objects of my invention is to provide an improved method of transforming the chemical energy of a fuel into mechanical energy in internal combustion engines by securing a more complete combustion of the fuel than has heretofore been obtained; to secure a more thorough propagation of the flame throughout the charge; and to utilize a higher compression than has heretofore been the practice.

A further object of this invention is to provide means for utilizing my improved method commercially.

A further object is to provide an internal combustion engine which is arranged to utilize a leaner mixture than has heretofore been possible, thereby insuring a more complete combustion resulting in a higher efficiency and a greater freedom from carbonization; and to provide a relatively long stroke high compression motor so arranged that preignition is minimized.

Other objects are to provide an internal combustion engine which will readily use a low grade hydrocarbon liquid fuel, and which will secure a high efficiency and freedom from carbonization, even when a low grade hydrocarbon is used.

Figure 1:
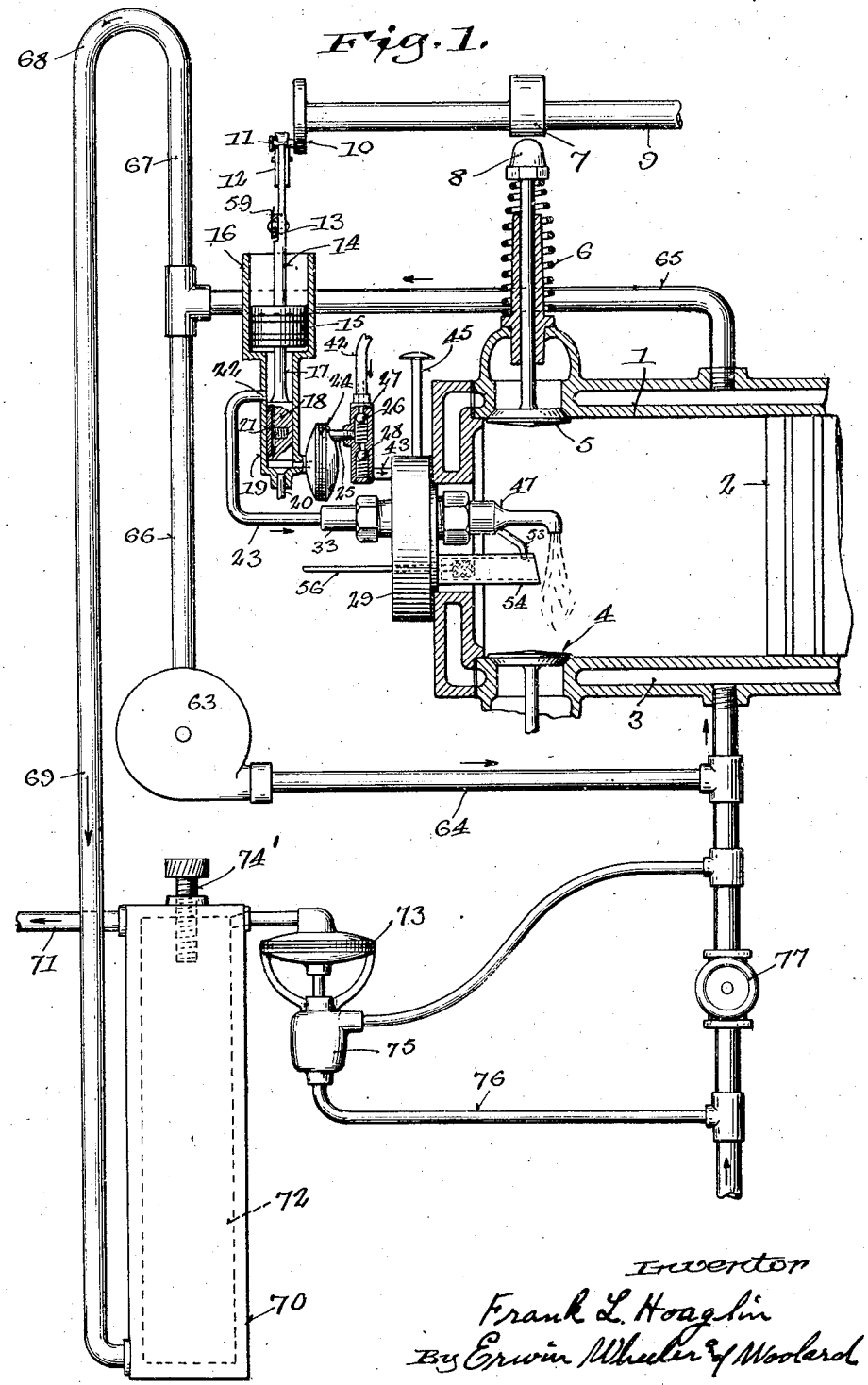
Figure 1 is a fragmentary view of the complete system.

My improved method may be briefly described independently of any specific mechanical contrivance used in its practice as follows:

Instead of attempting to utilize a carbureter or equivalent devices in an effort to develop a theoretically perfect mixture to be then compressed and fired in an engine cylinder, I prepare two mixtures, in one of which the supply of fuel is below the normal or theoretically correct standard, such mixture being known as a "lean mixture", and in the other of which the supply of fuel is in excess of that standard, i. e., a "rich mixture". The lean mixture is prepared in a relatively large volume and both mixtures are simultaneously compressed. The rich mixture is thereupon ignited and while in a state of slow combustion is allowed to flow or be delivered by its own expansion into the lean mixture, whereupon rapid combustion develops with increased rapidity of expansion and correspondingly thorough distribution thruout the lean mixture, thereby maintaining combustion thruout the latter, and insuring complete combustion of all the fuel in both mixtures.

My invention will now be described with reference to the specific structure which I have devised for utilizing my improved method:

In practice I prefer to apply my invention to an unusually long stroke motor. A long stroke motor can be made to develop very high pressure in the cylinder during the compression stroke which would result in correspondingly increased power and efficiency were it not that in present practice the maximum practical compression is limited by the tendency of the highly combustible mixture to pre-ignite. It will be noted that by dividing my mixture into two parts, one of which is very lean and the other very rich, I have made neither part readily combustible, altho both together will form a more nearly correctly proportioned explosive mixture. Thus I am able to subject both parts of the mixture to the high pressures developed in a long stroke motor without a danger of pre-ignition corresponding to that which would exist if the fuel charge were not so divided. Then after both parts have been compressed I am able to unite them to secure the high power which such compression aids in producing.

A second reason why I prefer to use a long stroke motor is in order to use efficiently the high power thus obtained. If the explosion were practically instantaneous as it is in most motors, the heat upon which the power is dependent would be dissipated to a large extent before the crank throw had rotated any great distance beyond dead center. In my device, however, the process of combustion is relatively slow. The rich mixture is first ignited and by its own expansion will be forcibly expelled from the small chamber into the cylinder where it will unite with the lean portion of the charge to form a more nearly correctly proportioned mixture. It is evident that this admixture will occupy an appreciable space of time sufficient to prolong the explosive effort thruout most of the expansion stroke.

The cylinder 1 has the usual piston 2 arranged to reciprocate therein, and is provided with a water jacket 3. The inlet valve for the air is indicated at 4, and is a spring held poppet valve 4 which functions when the pressure within the cylinder is lower than that of the surrounding atmosphere. The exhaust valve 5 is also a poppet valve, and may be held in closed position both by the internal pressure within the cylinder and also by a spring 6. It is operated by means of a cam 7 and cam follower 8, the cam 7 being mounted upon a cam shaft 9 which is driven in the usual manner by gearing (not shown) from the crank shaft. This cam shaft is adapted to rotate once for every two revolutions of the crank shaft. At the rear end of the cam shaft 9 a disk 10 is provided which is equipped with a crank pin 11 which in turn is releasably engaged by a pitman 12. The pitman 12 is pivotally connected at 13 to the piston rod 14 of an air pump piston 15 which reciprocates in a cylinder 16. The lower portion of the piston 15 is connected by means of an auxiliary piston rod 17 with a smaller piston 18 which in turn works in a smaller cylinder 19. The cylinder 19 may be provided with a drain cock 20 at its lower end. The piston 19 has a spring pressed portion 21 which acts as a valve to open and close a port 22 formed in the wall of the cylinder 19. It will be noted that the cylinder 19 has its upper portion in direct communication with the lower portion of the cylinder 16. The arrangement is such that when air is compressed by the piston 15 upon its downward travel such compressed air is suddenly released by the sliding of the member 21 past the port 22 and a sudden blast of relatively highly compressed air is discharged thru the pipe 23. It is of course understood that a suitable inlet valve is provided in connection with the cylinder 16 so that a fresh charge of air may be drawn into such cylinder upon the upward stroke of the piston 15. The bottom portion of the cylinder 19 communicates with one side of a diaphragm pump 24, the other side of such pump being connected by means of a pipe 25 with a fitting 26 which is provided with an inlet valve 27 and an outlet valve 28 spring held in their normal positions. The diaphragm pump 24 consists of a casing with a central dividing diaphragm which separates the casing into two distinct and non-communicating compartments. By this means, it is possible to operate the diaphragm pump 24 by means of the piston 18 without having the liquid fuel handled by the pump 24 coming into contact with the piston 18.

Fuel is adapted to be drawn thru the pipe 42 by the diaphragm pump and passed outwardly thru the pipe 43 to the charge forming device at the same time that the sudden blast of highly compressed air is delivered to the charge forming device.

Figure 2:
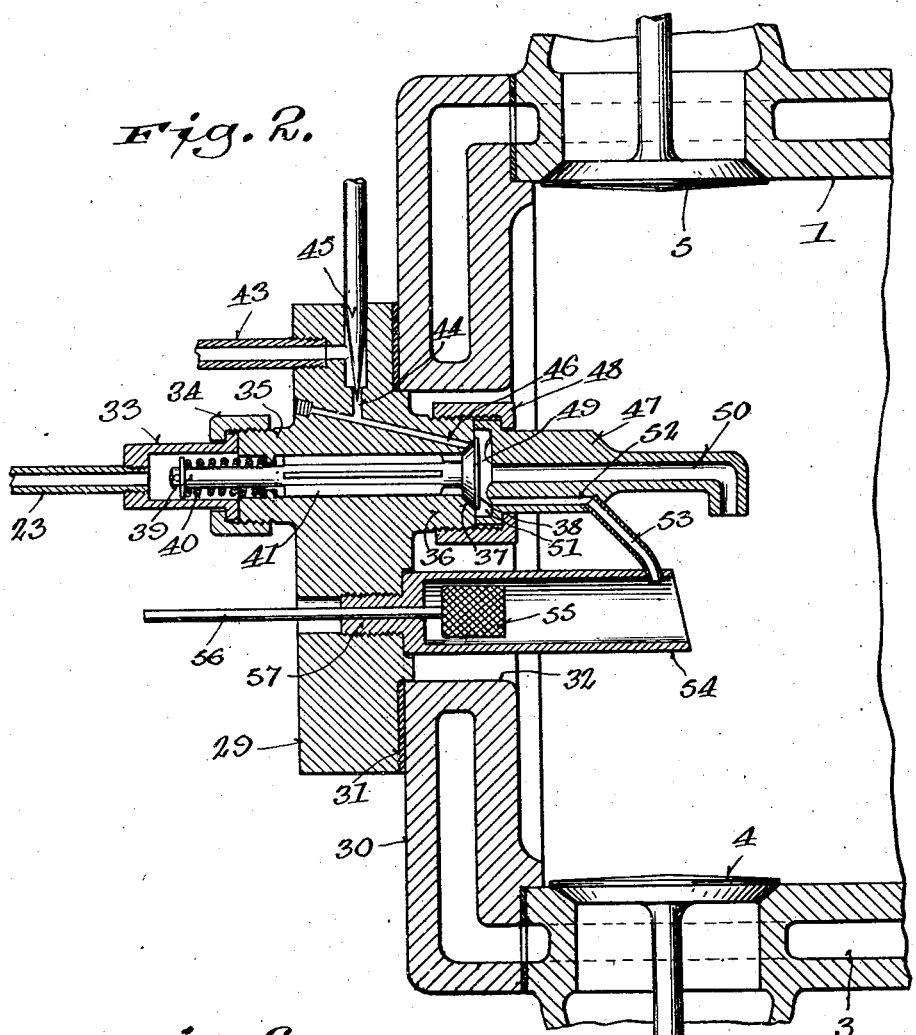
Figure 2 is a detail of the charge forming device in position at the rear portion of the cylinder.

Fig. 2 shows in enlarged form the charge forming device and the rear portion of the cylinder. The charge forming device consists of a plate 29 which is clamped against the gasket 31 against the rear portion of the cylinder head 30 by means of bolts or other suitable devices (not shown). This charge forming device has projecting portions which extend thru an opening 32 in the cylinder head into the cylinder proper. It is to be understood that the size of the charge forming device is exaggerated in the drawings in proportion to the size of the cylinder, for the sake of clearness. The pipe 23 is screwed into a fitting 33 which is clamped by means of a union 34 to a threaded projection 35 formed upon the rear portion of the plate 29. A projection 36 formed upon a forward portion of the plate 29 is in alignment with the projection 35 and is provided with a valve seat 37 upon which rests a valve 38. The valve 38 has its spindle 39 rearwardly pressed by means of a spring 40 to retain the valve firmly in seated position. A duct 41 passes from the pipe 23 thru the projections 35 and 36 and the plate 29 to the rear portion of the valve 38. The pipe 43 is threaded into the plate 29 and communicates with a passage 44 under the control of a needle valve 45. The passage 44 opens into a passage 46 which ends in the seat 37 of the valve 38 and is therefore closed when the valve 38 is seated. In front of the valve 38, a nozzle-like member 47 is held by means of a union 48 threadably engaging the projection 36.

The member 47 has an opening 49 directly in front of the valve 38 and is provided with a duct 50 which opens into such cavity 49 and extends outwardly therefrom finally turning at right angles and discharging towards the side of the cylinder in direct line with the air inlet valve 4. The member 47 has an annular groove 51 formed as a part of the opening 49 and a duct 52 leads from such annular groove outwardly therefrom. A pipe 53 communicates with the duct at one end and with an auxiliary cylinder 54 which is mounted within the main cylinder and opens directly thereinto. The auxiliary cylinder 54 carries an igniting member 55 which may be in the form of metal gauze carried upon a rod 56 and adjustable inwardly and outwardly within the auxiliary cylinder 54. The auxiliary cylinder 54 is held by means of a threaded projection 57 within the plate 29. If desired, the igniter 55 may be replaced by a spark plug which occupies the same position as the igniter 55. If no spark plug is used in connection with the auxiliary cylinder 54, it is usual to provide a starting spark plug (not shown) at some other point in the rear portion of the cylinder.

The operation of the charge forming device and of the engine is as follows: Assuming that the engine is in operation, the following cycle takes place. The fuel is passed along the pipe 43 by the diaphragm pump 24 and passes the regulating needle valve 45 and arrives by way of the duct 46 at the seat of the valve 38. At the same time, the highly compressed air from the cylinder 16 is suddenly discharged by means of the valve mechanism 21 into the pipe 23 and passes therefrom into the duct 41. This highly compressed air raises the valve 38 and atomizes the fuel and forces such fuel in a finely atomized condition thru the duct 50 and at right angles thereto directly into the stream of incoming fresh air, as the piston is on the suction stroke. A portion of the fuel is caught by the groove 51 and passes along the duct 52, pipe 53 into the cylinder 54, together with some of the undiluted atomized fuel. The auxiliary cylinder 54 readily vaporizes any liquid fuel that collects therein due to the heat that is stored in such cylinder from previous explosions and forms a very rich mixture within the auxiliary cylinder. It will be noted that the atomized fuel forms a rich mixture, but that this rich mixture is divided into two parts, one of which is retained in its original richness within the cylinder 54 and the other, which is the major portion, is diluted by means of incoming fresh air so that a lean mixture is produced within the main cylinder. This lean mixture has such a large proportion of air that it will not ignite by a spark in the usual manner, but it is necessary to project a flame into the body of such mixture after it has been compressed by the return stroke of the piston in order to cause such mixture to burn. This latter function is accomplished by means of the auxiliary cylinder in which the undiluted rich mixture is retained. The compression of the thin mixture also compresses the rich mixture within the auxiliary cylinder 54 and causes such mixture to move rearwardly in such cylinder and into contact with the highly heated igniter 55. An ignition of the rich mixture consequently occurs and the flame from the auxiliary cylinder is projected into the mass of highly compressed lean mixture causing ready ignition thereof. If the igniter of the type shown is used, the timing of the engine may be secured by adjusting the igniter nearer to or farther from the forward portion of the auxiliary cylinder by means of the rod 56. If a spark plug is used in this auxiliary cylinder, the time is secured in the usual manner.

Figure 3:
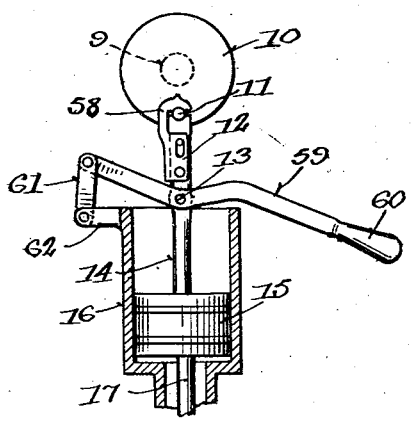
Figure 3 is a detail of the air pump for operating the charge forming device.

In starting the engine it is desirable that manual means shall be provided for forming the initial charge or charges. This manual means of forming the charges is provided by the construction illustrated in Fig. 3 which is a detail of the pump illustrated in Fig. 1. The piston rod 14 has pivotally connected thereto at 13 a pitman 12 which at its forward end is connected with the crank pin 11 by means of a detachable clasp or clamp 58 which may be readily disconnected from the crank pin 11 and may be readily connected thereto while such crank pin is in motion. A lever 59 is also pivoted at 13 to the piston rod 14 such lever being provided with a handle 60 at one end, whereby it may be operated, and at the other end being pivoted to a link 61 which is in turn pivoted to a lug 62 formed upon the cylinder 16. It will thus be seen that in starting the engine, the clasp 58 may be disconnected from the crank pin 11 and a few strokes given the pistons 15 and 18 by means of the lever 59 and handle 60. This will serve to supply the cylinder with fuel for the initial starting and will atomize such fuel in the manner in which it is atomized when the engine is running as previously described. This initial charge may then be fired by means of a spark plug, not shown, and the engine started. Thereafter the clasp 58 is placed in engagement with the crank pin 11 and the pistons 15 and 18 are periodically reciprocated by such crank pin.

The cooling system for this engine comprises a pump 63 which forces the cooling water thru a pipe 64 thru the water jacket 3, thru the pipe 65 and 66 back to such pump. An overflow is provided by the pipe 67 which passes upwardly to a curved portion 68 and then downwardly along a straight portion 69 into the bottom of the outer casing 70 of a thermostat and outwardly therefrom at its upper portion thru the pipe 71.

This thermostat comprises an inner cylinder 72 which is filled with alcohol or other fluid which expands when under the influence of heat so that the pressure or increase in volume of this fluid may be utilized to operate a diaphragm motor 73 which is in direct communication with the cylinder 72. To vary the temperature at which this thermostat will respond, a threaded plug 74' is arranged to be screwed downwardly into the inner cylinder 72 of the thermostat and thereby vary its volume and correspondingly vary the point at which response is made to temperature changes. A rod 74 communicates the motion of the diaphragm of the diaphragm motor 73 to a valve 75. This valve controls the flow of relatively cool fresh water from the mains 76 into the cooling system and thereby controls the temperature of the circulating water in said system. The pressure in the circulatory system need be only great enough to cause the water to properly circulate, and will roughly approximate that due to the hydrostatic head in the circulatory system, the pressure in the mains easily overcoming such head as it is contemplated attaching the system to water mains in which a reasonable pressure is maintained. A drain 77 is provided at the lowermost point in the circulatory system whereby such system may be readily emptied. The drain 77 may conveniently have a three way type of valve so that when it is turned in one position water may be drained from the circulatory system, and when turned in another position water may be supplied such system from the mains. Communication with the system may be completely cut off, either from the drain opening or from the mains, with this type of valve.

It will be seen that an internal combustion engine and a charge forming device therefor have been provided which will utilize fuel of a very low grade and will cause the complete combustion of such fuel, thereby eliminating carbon deposit and raising the efficiency of the machine.

It will be seen that a method and apparatus have been provided whereby it is possible to utilize a very lean mixture which will not be exploded, even when compressed, by an electric spark, but which is exploded by means of a flame projected thereinto from an auxiliary cylinder which has been filled with a relatively rich mixture. It will further be seen that a thermostatic control of the temperature of the cylinder is provided and that ready adjustment may be made.

I claim:

1. The combination with an internal combustion engine including a valved cylinder and a piston; of a fitting inserted into the cylinder through its walls and including a nozzle, a main passage therefrom leading to the engine cylinder, an auxiliary cylinder in communication with the engine cylinder, and a by-pass leading from said nozzle to the interior of the auxiliary cylinder; means operative during the suction stroke of the piston for supplying a rich mixture of air and fuel through said nozzle and said by-pass, and an ignition device movable to and from the engine cylinder within the auxiliary cylinder, whereby to control the timing of the explosion of the carburetted mixture.

2. The combination with an internal combustion engine including a valved cylinder, and a piston; of a fitting inserted into the cylinder through its wall and including a nozzle, a main passage therefrom leading to the engine cylinder, an auxiliary cylinder in communication with the engine cylinder, and a by-pass leading from said nozzle to the interior of the auxiliary cylinder; and means operative during the suction stroke of the piston for supplying a rich mixture of air and fuel through said nozzle and said by-pass.

3. The combination with the apertured cylinder of an internal combustion engine, of a fitting associated with said aperture, a nozzle carried by said fitting, a tube comprising an auxiliary cylinder carried by said fitting in communication with the engine cylinder, a by-pass between the nozzle and the tube, means for supplying a carburetted mixture to the nozzle at predetermined intervals, and an igniting device movable to and from the engine cylinder within the auxiliary cylinder, whereby to control the timing of the explosion of the carburetted mixture.

4. The combination with an internal combustion engine including a valved cylinder and a piston; of a fitting inserted into the cylinder through its walls and including a nozzle, a main passage therefrom leading to the engine cylinder, an auxiliary cylinder in communication with the engine cylinder, and a by-pass leading from said nozzle to the interior of the auxiliary cylinder; means operative during the suction stroke of the piston for supplying a rich mixture of air and fuel through said nozzle and said by-pass, and an ignition device movable to and from the engine cylinder within the auxiliary cylinder, whereby to control the timing of the explosion of the carburetted mixture, said ignition device comprising a heat absorbing element adapted to glow during the operation of the engine.

5. The combination with the apertured cylinder of an internal combustion engine, of a fitting associated with said aperture, a nozzle carried by said fitting; a tube comprising an auxiliary cylinder carried by said fitting in communication with the engine cylinder, a by-pass between the nozzle and tube, means for supplying the carburetted mixture to the nozzle at predetermined intervals, and an ignition device movable to and from the engine cylinder within the auxiliary cylinder, said ignition device comprising a heat absorbing element adapted to glow during the operation of the engine.

In testimony whereof I affix my signature.

FRANK L. HOAGLIN.